Feb. 13, 1934. J. F. AMOS 1,946,471
METHOD AND APPARATUS FOR MOLDING HOLLOW ARTICLES
Filed Nov. 17, 1930 5 Sheets-Sheet 2
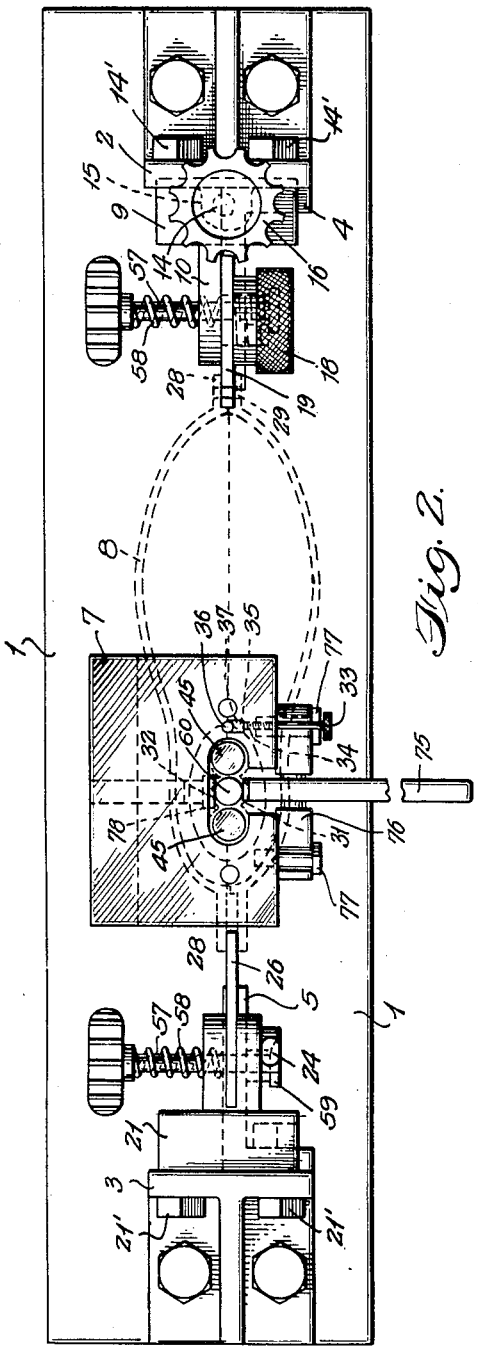
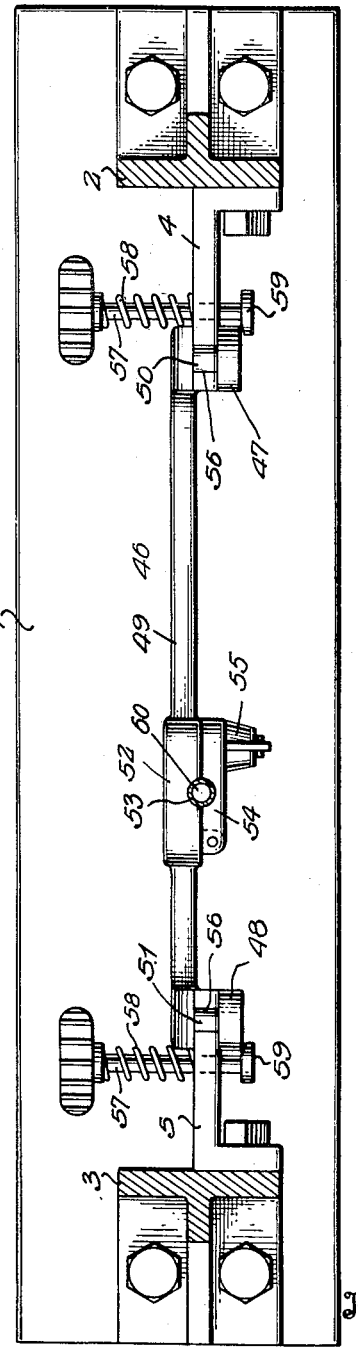
Inventor
John F. Amos
By Steward + McKay
his Attorneys Inventor
JOHN F. AMOS.
By Steward & McKay
his Attorneys

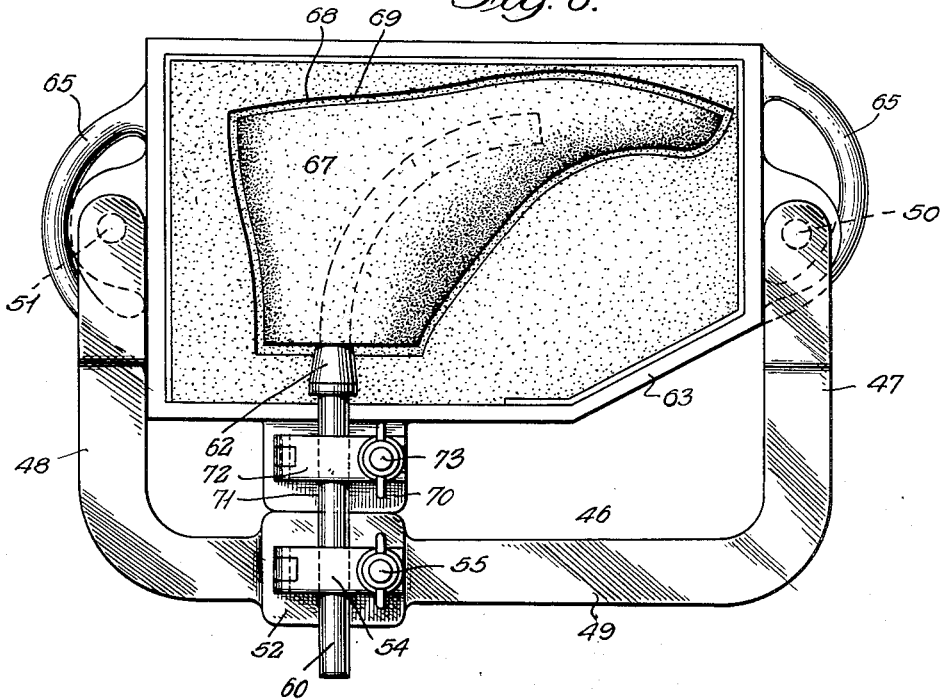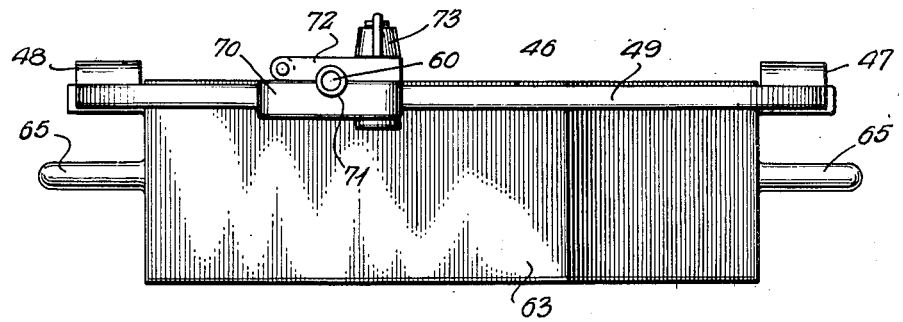

Feb. 13, 1934.  J. F. AMOS  1,946,471
METHOD AND APPARATUS FOR MOLDING HOLLOW ARTICLES
Filed Nov. 17, 1930  5 Sheets-Sheet 5
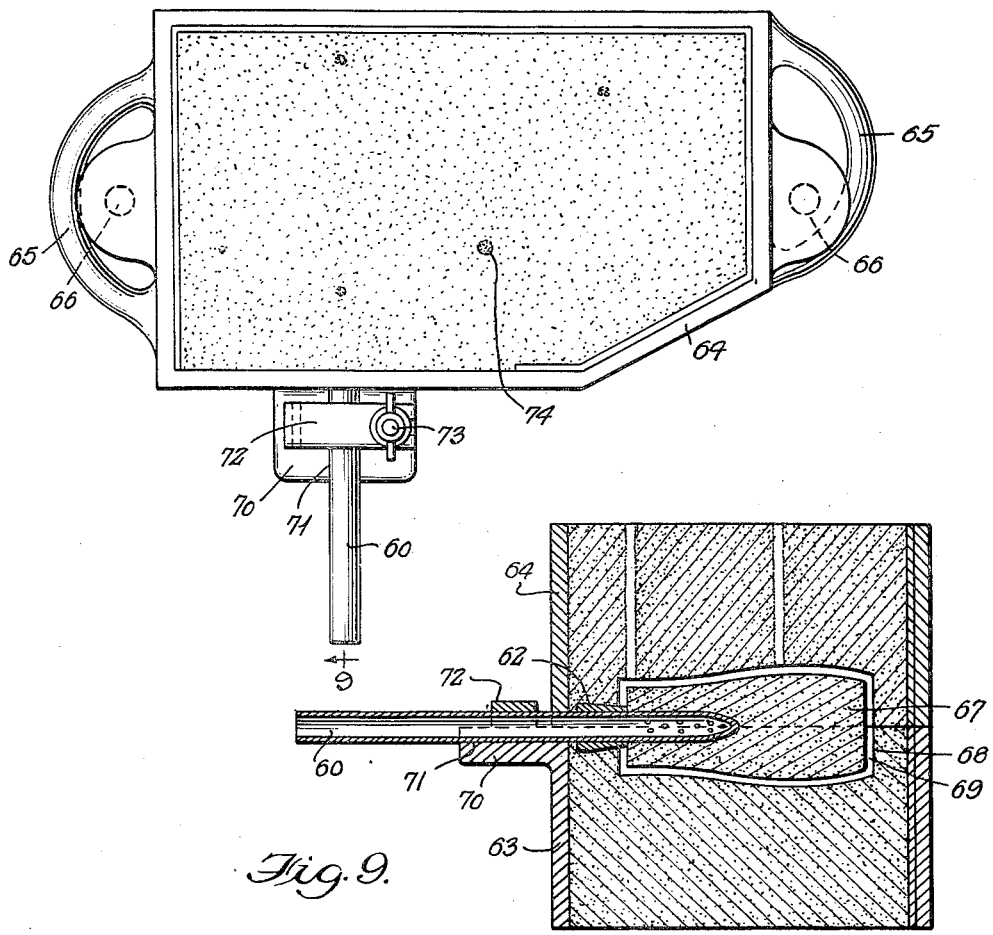
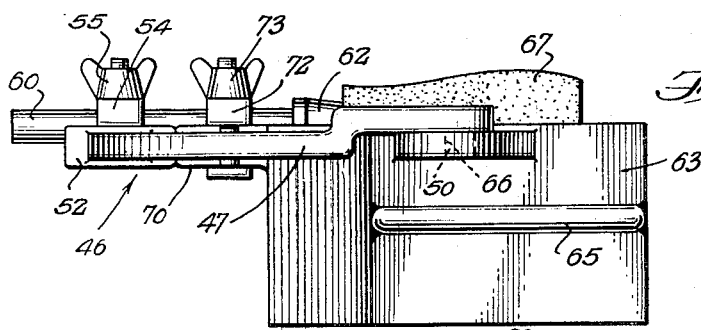
Inventor
JOHN F. AMOS.
By Steward & McKay
his Attorneys Patented Feb. 13, 1934

1,946,471

UNITED STATES PATENT OFFICE 1,946,471

METHOD AND APPARATUS FOR MOLDING HOLLOW ARTICLES

John Frederick Amos, Mishawaka, Ind.

Application November 17, 1930
Serial No. 496,288

16 Claims. (Cl. 22—193)

This invention relates to methods and apparatus for molding hollow articles. The invention is particularly useful in molding hollow metal lasts and for convenience it will be described and illustrated as so used, but it is to be understood that the invention is not limited to this particular use.

In making these lasts the core must be placed accurately, and firmly fixed within the mold, leaving an enclosed space of definite and uniform thickness between the outside surface of the core and the inside surface of the mold, so that the walls of the last or other hollow article molded in such space will be of the desired thickness throughout. To effect this result it is customary, in one proposal in the prior art, when forming the core to secure it to a core carrier, or guide member, mechanism being provided for adjusting the position of the core with relation to the carrier, the carrier and the core then being associated with a mold in such a way as to ensure proper positioning of the core within the mold. In forming the core, the core carrier is placed on the supporting frame of a core machine and the core arbor is clamped to the carrier. A core box is then mounted in the frame and adjusted therein until it is properly positioned with reference to the arbor. After forming the core within the box and around the free end of the arbor, the core box is removed from the core and the carrier and the core carried thereby is then secured to or mounted upon the drag member of the flask in such a position that the core is properly placed inside the mold.

In the prior art just discussed, the feeding of the core mixture into the core box is impeded by the core carrier. The carrier extends over the open top of the core box when the core is being made and greatly interferes with the workman in putting the mixture into the core box and packing it. An important feature of my invention resides in the fact that the top of the core box is left clear when the core is being made so that there is nothing to interfere with putting the core mixture into the box and packing it. Another feature of my invention, which is of vital importance, consists in the manner of mounting the core arbor upon the flask. In the prior art the core arbor remained upon the carrier during the pouring operation, and was mounted indirectly in position upon the flask through the medium of the carrier. This required a separate carrier for every casting molded during a given heat. Consequently a large number of carriers was needed, every one of which had to be accurately machined to within a fraction of one one-thousandth of an inch. All this meant great expense and liability to damage, as well as unreliability in service.

According to my invention, the carrier with the attached core and arbor is brought into proper position upon the drag member of the flask, the arbor is then directly secured to the drag and the carrier is removed before the casting operation takes place. The carrier is thus free to be used with as many other cores and molds as may be needed for the heat. Two carriers will serve for continuous operation.

Another advantage arising from my invention resides in the fact that the core arbor is rigidly and firmly secured to the drag flask, preventing floating or movement of the core while the casting is being made. Floating gives the casting uneven side walls. This is a great disadvantage, for the walls of the castings need to be only about one-eighth of an inch thick and must be made thicker to allow for inaccuracies if not true. Holding an even thickness results in a saving in metal and machine work.

I have also produced an adjusting mechanism for placing the cores in position in the mounting frame, that is much simpler, quicker to operate and more reliable than that in use heretofore.

My invention is not confined to the apparatus described, but another and important feature resides in the method of assembling the core and flask.

My invention also includes the novel features hereinafter described and pointed out in the claims. In the accompaying drawings, Fig. 1 is a side elevation of the core machine and carrier, with the core box in dotted lines;

Fig. 2 is a top plan view of the same with the carrier removed;

Fig. 3 is a horizontal section on the line 3—3 of Fig. 1;

Fig. 6 is a plan of the core assembled with the drag flask, with the core arbor and carrier attached to the flask;

Fig. 7 is a front elevation of the same;

Fig. 8 is a plan of the complete mold with flasks and core assembled;

Fig. 9 is a section on line 9—9 of Fig. 8, and

Fig. 10 is an end view of the drag flask, core, and carrier.

Figure 1:
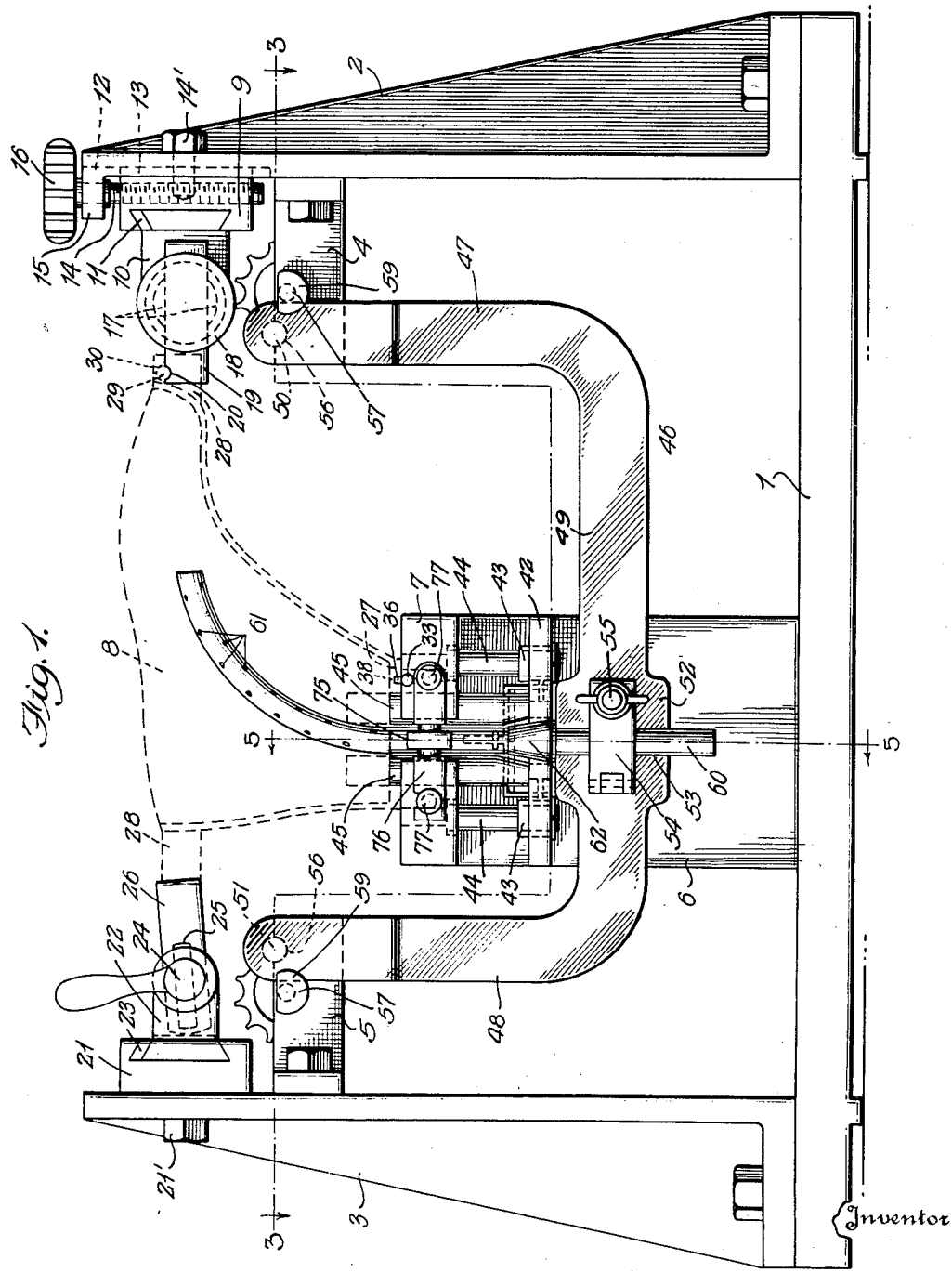
Figure 4:
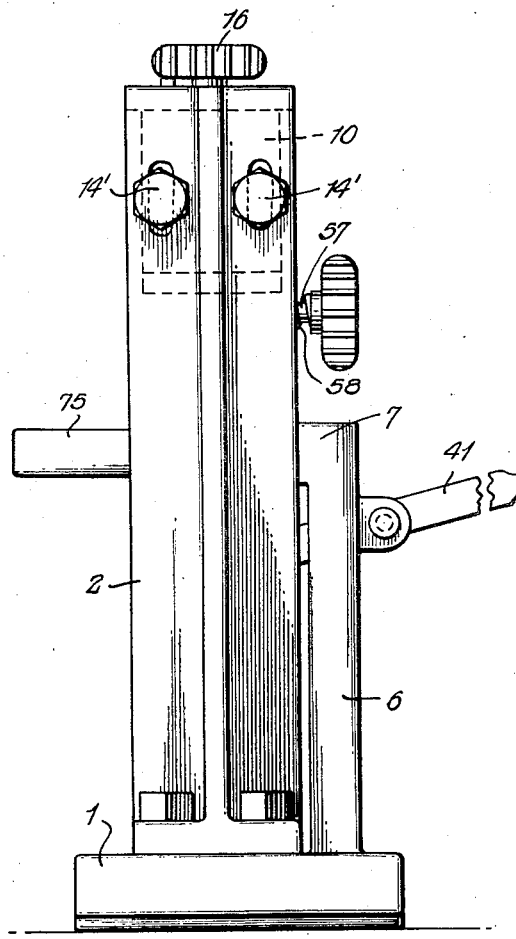
Fig. 4 is a front elevation of the same.

The molding apparatus embodying this invention comprises generally a core machine, wherein the core is formed and associated with a core carrier, and a mold with which the core and the core carrier are associated for the molding of the last or other article to be molded.

Referring to Figs. 1 to 5 of the drawings, the numeral 1 designates the base plate of the core machine and 2 and 3 are the front and rear standards or uprights, respectively. Mounted on the front standard is a bracket 4, constituting the front support for the carrier and on the rear standard is mounted a similar bracket 5 for supporting the rear end of the carrier. Intermediate the standards a pedestal 6 is mounted on the base plate, carrying a core box platform 7 at its upper end. 8 is the core box shown in dotted lines in Figs. 1 and 2.

A block 9 having a part 13 slidable vertically in a way or groove 12 in the front upright is provided with a dovetailed recess into which the dovetailed end of adjusting bracket 10 slides horizontally. A lost motion gib 11 serves to take up wear and to hold the bracket 10 in position. The block 9 and bracket 10, which constitute the supporting means for the toe of the core box, are adjusted vertically by means of the screw 14 mounted in an offset 15 at the top of the front standard, and the screw is operated by means of an operating head or handle 16. Lock screws 14' lock or clamp the block 9 in adjusted position.

Holding jaws or bosses 17 project laterally from bracket 10, and a cap member 18 is threaded on the jaws for holding the core box supporting member or strip 19 in place. This strip is notched at 20 to receive a pin 29 on the core box hereinafter described.

A block 21, clamped to standard 3 by bolts 21' and having a dovetailed recess, supports a dovetailed adjusting bracket 22 for the heel of the core box. A gib 23 serves the same purpose as the gib 11. A core box supporting member or strip 26 having a slot 25 is supported upon the bracket 22 and secured thereto by means of the clamp 24. A "match plate" (not shown) may be used to position the core box on the platform after such position has been determined.

The lower end of the core box 8, as viewed in Fig. 1, is enclosed as shown at 27. The core box consists of two halves, and each half is provided with front and rear lugs 28. A pin 29 is mounted on one of the toe lugs and enters a pin seat opening 30 in the opposite toe lug for matching the two parts of the core box together. C clamps or the like (not shown) are used to hold the parts of the core box together. In the bottom wall 27 of the core box are openings 31 and 32 for receiving the core arbor 60 and the molding pins 45, respectively.

Means for making an additional slight adjustment of the core box relative to the platform is provided in the form of a sliding bracket 35 operated by an adjusting rod 33. Bracket 35 carries a pin 36 which projects through a slot 37 in the platform 7 and into an opening or depression 38 formed in the meeting edges of the core box. Rod 33, which is mounted in platform 7 so that rotary movement thereof relative to the platform is permitted but longitudinal movement is prevented, has a threaded end portion 34 which engages in an internally threaded portion of bracket 35 so that when rod 33 is turned, the bracket 35 and the core box will be moved or adjusted accordingly.

Figure 5:
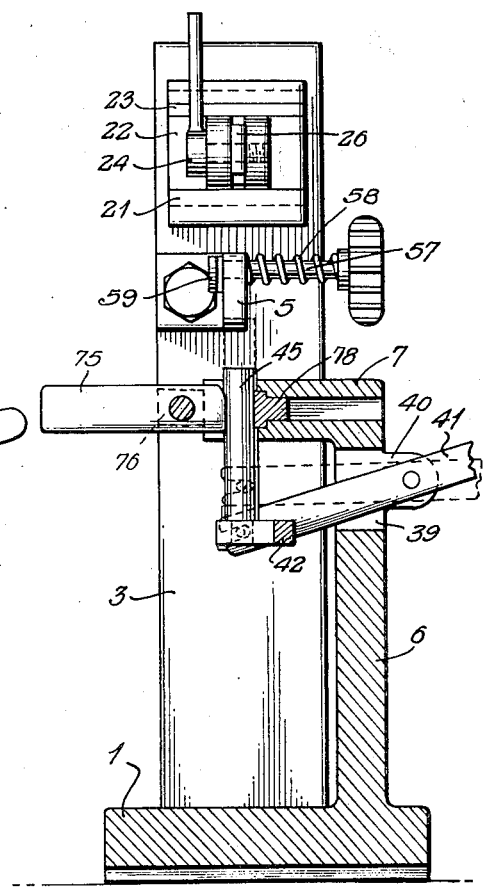
Fig. 5 is a section on line 5—5 of Fig. 1, with the carrier and core box removed.

Referring more particularly to Figs. 1 and 5, the pedestal 6 is slotted at 39 to receive a supporting arm 41 pivotally mounted on the bracket 40. This arm operates the molding pin base which slides upon guide pins 44 projecting downward from platform 7, bushings 43 being mounted on the base 42 to receive said guide pins. Base 42 is provided with two molding pins 45. By means of the mechanism described, the molding pins may be moved from the position shown in full lines in Fig. 1 to the dotted line position to form openings 32ª in the core for the purpose of providing thickened portions on the finished casting.

A lever 75 pivotally connected to a bar 76 secured to the platform 7 by screws or similar fastening means 77, cooperates with the jaw 78 mounted in the platform 7 to temporarily clamp or support the core arbor 60.

The core carrier or guide member 46, which may be described generally as being U or trough-shaped, having front and rear arms 47 and 48 respectively, and a lower or connecting part 49 carries front and rear bearing pins 50 and 51, and is enlarged at 52 in the lower horizontal portion to provide for a bearing 53 for the core arbor 60. A clamp plate 54 is mounted upon this enlarged portion and is fastened by means of a clamping screw 55 for holding the arbor rigidly in place.

Front and rear pin bearing recesses 56 are formed in the supports 4 and 5 to receive the pins 50 and 51 on the carrier and the carrier is held in place upon these supports by means of locking or clamping rods 57 which carry heads 59 to hold the carrier in proper position. Springs 58 are mounted upon the locking rods for holding them in locking or clamping position.

The core arbor 60 is provided with vents 61, and a sleeve 62 surrounds the arbor. These features are old in the art and need no further description.

Referring to Figs. 6 to 10, the drag member of a two-part flask is indicated at 63 and the cope member at 64. Handles 65 are mounted on the flask. Pins mounted upon one member of the flask enter pin holes 66 in the other member for registering these members. The molding outline of the core is shown at 67, and that of the flask is indicated by 68, while 69 indicates the space to be filled with metal to make the finished article or casting. On the drag member 63 of the flask is provided a lip or lug 70 having a bearing recess 71 for the core arbor 60. This lip engages the enlargement 52 of the carrier when the carrier is in place on the drag member and serves as an additional guide and bearing. A clamping plate 72 is mounted upon the lug 70 and is fastened by means of a clamping screw or bolt 73 to rigidly clamp the core arbor 60 in place.

In operation the carrier 46 is hung on the supports 4 and 5 of the core machine frame with the pins 50 and 51 resting in the recesses 56, and the carrier is then locked in place by the heads 59 and the clamping rods 57. The arbor 60, which is securely held on the carrier by the clamp 54, projects above the platform 7 and through opening 31 into the core box. The core box is adjusted horizontally at the toe and heel by moving the dovetailed core box supporting brackets in their ways. The toe support may be adjusted vertically by screw 14, and the lock screws 14' hold the toe support securely in place. The base of the core box is laterally adjusted by means of pin 36 operated by screw 33.

The molding pins 45 are elevated so as to project into the core box by the arm 41, and the core mixture is fed into the open upper end of the core box and packed. It will be observed that the horizontal part 49 of the carrier is below the core box and there is nothing above the box to prevent perfect freedom of action on the part of the operator while filling and packing.

The two-part core box is then opened and removed from the core and the carrier, with its arbor and core still attached, is now positioned on the drag member as shown in Fig. 6, with pins 50 and 51 entering the pin holes in the flask. It will be seen that the carrier is fixed in position on the drag member, as well as on the mounting frame of the core machine, by means of easily bored and absolutely accurate recesses in the core machine and drag, in which are received pins fixed on the carrier. Of course the elements may be reversed, with recesses in the ends of the carrier engaging pins on the other members.

Carrier and core having been fixed relative to the drag member, the core arbor is now clamped directly to the drag member by means of the clamp 72 on the drag member. Since the carrier is no longer needed to hold the arbor on the drag, it is released from the arbor and drag, to be mounted again in the core machine without waiting for the casting to be finished before it can be taken from the flask, as is the case when the carrier is a necessary element of the means for securing the core in the mold.

The two members of the flask are then assembled and the article is cast in the usual way by pouring the molten material through the usual pour gate 74.

If, upon examination, the walls of the first casting are found to be non-uniform in thickness, further adjustments of the core box in the core machine may be made to remedy any defects in the subsequently molded articles.

It will be seen that the carrier acts as a guide for quickly and accurately positioning the core with respect to the mold and that after the core is correctly positioned relative to the mold, it is firmly held against relative movement during the casting operation by the mold itself, the carrier being removed before the casting operation begins for use with other molds.

Various changes in the procedure and apparatus described above can, of course, be made without departing from the scope of the invention as defined in the appended claims.

What is claimed is:

1. In the molding of hollow articles, the process which comprises forming a core with a definite predetermined relation to a carrier, transferring said core and carrier to a flask member while maintaining said relation, positioning said core relative to the flask member by said carrier, and removing the carrier without disturbing the position of the core relative to the flask member.

2. In the molding of hollow articles, the process which comprises mounting a core arbor on a carrier, mounting the carrier on a flask member, securing the arbor to the flask member, and releasing the carrier from the flask member and arbor without releasing the arbor from the flask member.

3. Molding apparatus comprising, in combination, a core, a flask member, means for supporting said core and arranged to be associated with said flask member to determine the relative positions of said core and flask member, and means carried by said flask member to maintain said relative positions independently of such supporting means.

4. A U-shaped carrier having means on each arm for engaging a core machine or a drag flask, and means on its lower or connecting member for holding a core arbor.

5. A U-shaped carrier having means on each arm for engaging a core machine or drag flask, and means on its lower or connecting member for holding a core arbor, the connecting member being enlarged where the holding means is located.

6. A U-shaped carrier having at each of its extremities one member of a pin-and-recess connection, an arbor bearing or recess extending transversely across its connecting member, and a clamp for securing the arbor in said recess.

7. The combination, with flask members each having one member of a pin- and-bore connection at each end or side for ensuring proper registry of said flask members when assembled, of a core carrier having connection members corresponding to the connection members carried by one of said flask members and adapted to register with the connection members carried by the other flask member.

8. The combination, with a drag flask having an outwardly projecting lip at one side and means at each end for matching a cooperating part, of a U-shaped core carrier having a face on its connecting member for engaging the outer face of the lip, and matching means on each arm for engaging the matching means on the flask to definitely position the core carrier on said flask member.

9. The combination, with flask members having spaced registering or matching means for ensuring proper registry of said members when assembled and a core machine having identically spaced matching means, of a core carrier having matching means spaced the same as those on the flask and machine, and cooperating with either to definitely position the core carrier thereon.

10. The combination, with a flask member having spaced registering or matching means, of a U-shaped core carrier having arms provided adjacent their free ends with means adapted to engage the registering or matching means of said flask member to definitely position the core carrier on said flask member.

11. The combination, with a flask member having spaced registering or matching means, of a core carrier provided with correspondingly spaced registering or matching means adapted to interlockingly engage the registering or matching means of the flask member.

12. The combination, with a core molding machine and a flask member, of core-supporting means adapted to be associated first with the core machine to determine the position of the core relative to the supporting means and then associated with the flask member to determine the position of the core relative to the flask member, and means carried by said flask member to maintain the relative positions of the flask member and core independently of said supporting means.

13. The combination, with a flask member, of a core carrier adapted to be temporarily connected to said flask member to determine the relative positions of the core and flask member, said flask member being provided with means for supporting said core independently of said carrier and for maintaining the relative positions of said core and flask member.

14. A U-shaped core carrier provided adjacent each of its ends with positioning means for engaging a core machine or a flask member, said core carrier being provided intermediate its ends with means for supporting a core.

15. A flask member provided with means for supporting a core carrier, said flask member also being provided with means for securing a core arbor thereto.

16. The combination, with flask members provided with means for ensuring proper registry of said members when assembled, of a core, and a core carrier adapted to be associated with one of said flask members and provided with means adapted to engage such registry-ensuring means to determine the relative positions of said core and flask member.

JOHN F. AMOS.